April 6, 1943. B. L. SMITH 2,315,987
PHOTOGRAPHIC CUT FILM HOLDER AND IDENTIFYING STENCIL OR TAB THEREFOR
Filed Oct. 1, 1941
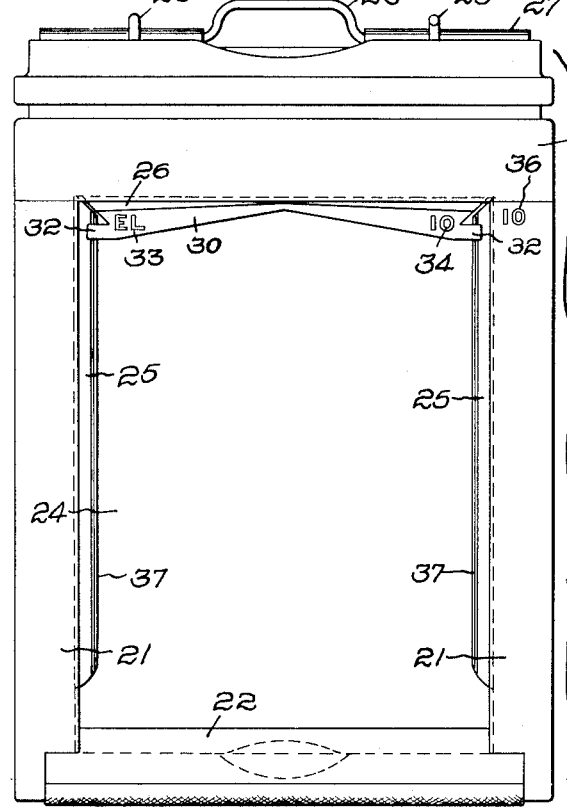
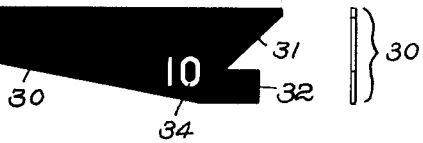
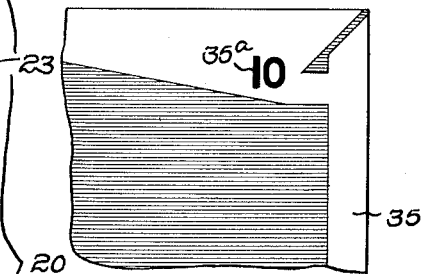
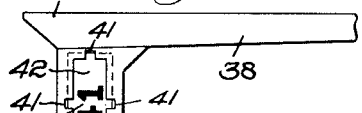
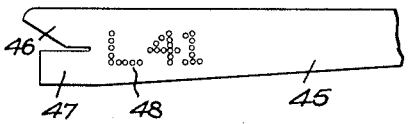
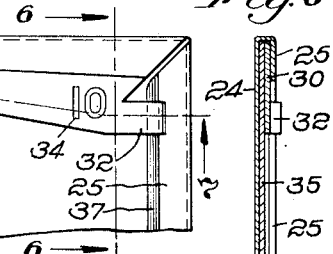
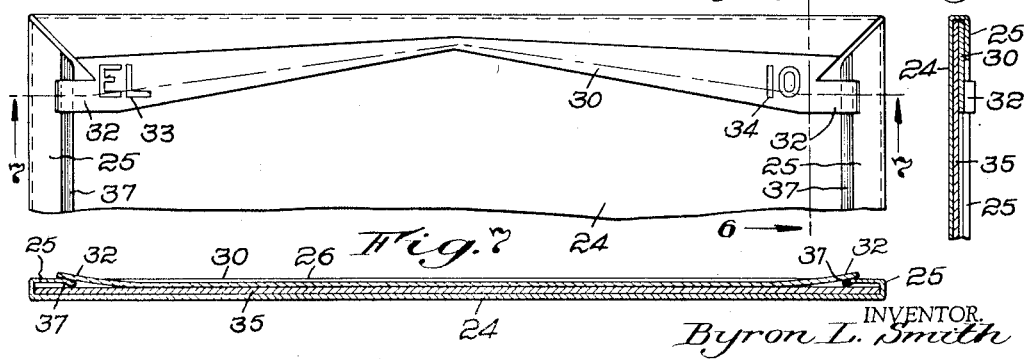
INVENTOR.
Byron L. Smith
BY
his Attorneys

UNITED STATES PATENT OFFICE 2,315,987

PHOTOGRAPHIC CUT FILM HOLDER AND IDENTIFYING STENCIL OR TAB THEREFOR

Byron L. Smith, East Rochester, N. Y., assignor to The Folmer Graflex Corporation, Rochester, N. Y., a corporation of Delaware Application October 1, 1941, Serial No. 413,132

15 Claims. (Cl. 95—1.1)

This invention relates to new and improved photographic cut film holders having means for identifying negatives exposed therein and to the identifying stencil, tab or member as a new article of manufacture.

In order that the principle of the invention may be readily understood, I have disclosed a single embodiment thereof in the accompanying drawing, wherein—

Fig. 1 is a front elevation of a cut film holder with one of the dark slides removed, showing the position of the stencil or identifying tab or member therein;

Fig. 2 is a detail in elevation of one of the stencil or identifying tabs or members opened out, or lying flat;

Fig. 3 is an end view of Fig. 2;

Fig. 4 is a fragmentary view of one corner of a negative that has been exposed and identified in my cut film holder;

Fig. 5 is an elevation of the upper end of a cut film holder septum, showing the position of the stencil or identifying tab or member;

Fig. 6 is a vertical section on the line 6—6 of Fig. 5;

Fig. 7 is a horizontal section on the irregular line 7—7 of Fig. 5;

Fig. 8 is a fragmentary detail in elevation of a modification constituting an identifying stencil, tab or member of an alternative structure; and Fig. 9 is a fragmentary detail in elevation of still another type of identifying stencil, tab or member of alternative structure, constituting a second modification of my invention.

One of the objects of this invention is to provide a cut film holder having means to identify readily a negative after it has been exposed. Other objects of the invention are to provide means identifying the particular operator who made the exposure, to provide means to change readily the stencils, tabs or members used in identifying the negative to correspond to different conditions that may arise in the use of the cut film holder, and to provide means for readily removing the stencil, tab or member from the cut film holder.

Referring to the drawing, I have in Fig. 1 shown a cut film holder which is desirably of the well known Graflex or Graphic type, fully disclosed in the patent to William F. Folmer, No. 1,631,479. Such holder, herein shown merely as one to which my invention may be readily applied, is designated generally at 20 and is preferably made of the usual side rails 21, 21, bottom flaps (one only being shown at 22) and upper cross members, the front upper cross member only being shown at 23. The holder is usually fitted with two film septums, one septum 24 only being herein shown. Each film septum 24 desirably has forwardly bent-over side edge formations 25, 25 and the upper end or edge of said film septum 24 is also forwardly bent over as indicated at 26. The bent-over side edges 25, 25 and the bent-over upper end or edge 26 form a pocket for receiving the sensitized cut film, thus maintaining it flat in the holder in a manner well known in the art. The said holder 20 is also equipped with the usual dark slide, one such slide only being shown at 27. Each such slide is provided with a handle 28 and a slide retaining lock 29. To such holder or to any other suitable holder I apply means for causing an identifying mark of any suitable character to be recorded on the exposed film when the latter is developed.

In Fig. 2 I have represented a suitable structure of stencil, tab or member particularly suited for the purpose. The body of the stencil or tab is indicated at 30 and is made up, in this embodiment of my invention, of a piece of Celluloid or some other suitable, substantially transparent material and is provided with terminal, preferably triangular, upper projections 31, 31, that are used to lock the stencil or tab 30 to the film septum 24. Within the scope of my invention certain translucent materials may be employed instead but with less satisfactory results. The said stencil or tab 30 is also preferably provided with two rectangular, terminal, lower projections 32, 32 that overlie the bent-over side edges 25, 25 of the film septum 24. The purpose of this construction is to hold the front edge of the stencil or tab 30 away from the face of the film septum 24, so that when the cut film is placed in the holder 20, underlying the bent-over side edges 25, 25, the upper end of the said cut film extends under the stencil or tab 30 and is guided into the upper bent-over formation 26 of the film septum 24. The said stencil or tab 30 is preferably coated with an opaque material over its entire surface at least at one face thereof, excepting where light is to be permitted to pass, as at the identifying area or areas such as "EL" at 33 and "10" at 34 of said stencil or tab 30, which, however, may be made of any suitable, substantially transparent material, in which case the index or identification areas 33 and 34 may be opaque, being if desired provided by stamping on the identifying or index data in opaque ink.

In order to prepare the holder 20 for making a photograph, the lower film flap 22 is turned outwardly upon its lower edge as a hinge, and a sheet of cut film such as 35 is placed under the bent-over side edges 25, 25 of the film septum and is slid upward by pressure of the fingers until it passes under the stencil or tab 30 and into the channel or pocket formed by the bent-over upper edge 26 of the film septum 24. The flap 22 is then closed and a dark slide 27 is placed in the holder 20 in the usual manner. The said holder is then placed in a camera and an exposure is made, after which the film is removed in the dark room and is developed in the usual manner. After development, the negative will appear as shown in part in Fig. 4, wherein the film is designated at 35. In the upper margin of said film 35 will appear at one side the identifying numeral or mark, in this instance the numeral "10," as indicated at 35a, shown in Fig. 4, and on the opposite corner of said film will appear the operator's identification, in this instance, the letters "EL," not shown in Fig. 4 but shown in Figs. 1 and 2. Within the scope of my invention, any markings may be applied. Usually the photographer's initials or other identification is placed at the area 33 and the film or negative number is placed at the area 34. Obviously this can be reversed or only one of such identification areas may be employed.

On the outside of one of the holder side members 21 is stamped a numeral, indicated at 36, which will correspond to the numeral at 34 of the film stencil or tab 30, in this instance the numeral "10." Thus every film exposed in the holder 20 will be marked with the same number appearing on the side rail of the said holder. The said identification stencil or tab 30 is readily placed in the film holder septum 24 by flexing slightly the body of the film stencil or tab 30 and allowing the upper terminal projections 31, 31 thereof to engage and overlie the turned-over side edges 25, 25, then pushing the identification stencil or tab 30 toward the top of the holder 20, under the bent-over formation 26 at the upper edge of the film septum, leaving the rectangular, lower, terminal tabs 32, 32 on the front face of the turned-over side edge formations 25, 25, as shown in Fig. 7. Inasmuch as the turned-over side edge formations 25, 25 have an additional inward bend on their inner edges, as shown at 37 in Figs. 5 and 7, the upper terminal projections 31, 31 will be engaged by the said edges 37, 37 of the film septum, because the stencil or tab 30 is caused to be stressed in a forward or outward direction by the said rectangular, terminal, upper projections 32, 32, thus preventing, as indicated in Fig. 7, the stencil or tab 30 from dropping out of the film holder septum 24.

Other identifying stencils or tabs within the scope of my invention can be employed, one such modification of my invention being shown in Fig. 8, wherein at 38 is indicated the cross member or portion of the identifying stencil or tab. In this modification the stencil or tab is preferably made of metal, or some suitable non-metal, non-transparent material, and has a downwardly extending formation 39 preferably integral therewith, wherein is an opening 40 and a series of lugs 41, 41 into which is fitted a separate identifying stencil or tab 42 made up of a substantially transparent piece, preferably Celluloid, having printed thereon the identifying numeral or other data indicated at 43 as "41." The said stencil or tab 38 has an upward, terminal, triangular formation 44 at each end for engaging the cut film septum, as described in connection with the first embodiment of my invention. The downwardly extending formation 39 rests on the cut film septum 34 or the film 35 when the latter is in position, and the said formation 39 has an upturned end 39a for guiding the film under the extending member and the stencil or tab 38.

In Fig. 9, I have represented as a second modification of my invention another type of stencil or tab that, within the scope of my invention, can readily be used, the same being indicated generally at 45, and having an upper triangular end formation 46 at each end and a lower rectangular protruding member 47 at each end, generally similar to the construction shown in Fig. 2 of the preferred form. Such stencil or tab 45 is preferably made of metal or some other suitable opaque material and has perforations forming the identification structure, as indicated at 48.

It will be apparent that within the scope of my invention, any one of the said three identifying stencils or tabs can readily be placed in cut film holders or removed therefrom, thus making it possible to convert a standard cut film holder to a holder having negative-identifying means. So far as I am aware, I am the first to provide a separate identifying stencil or tab for this purpose.

If for any reason it becomes desirable to obliterate the identifying mark or marks, this can readily be accomplished by pressure on the body of the identifying stencil or tab close to the turner-over edges 27 of the film septum 34. However, when once in place, the identifying stencil or film is securely held in position and unless deliberately removed it will remain in its proper position in the holder.

By my invention I have made it possible for the photographer to identify a negative after it has been removed from its holder. There has long been a need for simple means to convert standard cut film holders into holders having negative-marking means. So far as I am aware, I am the first to provide a practical device meeting all the requirements. The stencil or tab herein disclosed can be manufactured at very low cost and can be placed in functioning position in cut film holders by anyone capable of operating a camera.

My invention includes as a new article of manufacture and sale a negative-identifying device adapted for use with a standard or unmodified sensitized surface holder for photographic purposes, and particularly for cut films. The said device, which is intended to be sold apart from the sensitized-surface holders, or which can be supplied therewith, comprises a sheet-like member adapted to be slid into or suitably positioned in the holder at a place or zone therein where it will overlie an edge of the sensitized surface when the latter is positioned in the holder. The said sheet-like member may be sold without the identification data, which may be placed thereon by the user, or the identification data may be placed upon or made in the sheet-like member by placing the identifying data thereon in opaque ink or other suitable substance, or this result may be effected as in the modification shown in Fig. 9, by making in the sheet-like member suitable perforations constituting the identifying data and through which the light passes, the purpose being to have one part of the surface of the sheet-like member light-transmitting and another part opaque to the passage of light, so that by reason of such contrast the identification data may appear upon the negative.

Inasmuch as I am, so far as I am aware, the first to provide a sheet-like member for this purpose adapted to be used with an ordinary holder, particularly a cut film holder, I am herein claiming the same broadly and also the several herein disclosed, different, specific embodiments in detail.

Having thus described three embodiments of the invention, it is to be understood that although specific terms are employed, they are used in a generic and descriptive sense and not for purposes of limitation, the scope of the invention being set forth in the following claims.

I claim:

1. A sensitized surface holder for photographic purposes having a film septum or septums provided with forwardly turned-over top and lateral edges to receive a cut film, and a film identification device applied to a film septum of said holder having ends to engage and to be held in place by turned-over edges of said septum, said device comprising a sheet-like member adapted to be positioned in the holder overlying an edge portion only of the said film septum at the dark-slide insertion end of the said holder, so as to overlie an edge portion only of the cut film when positioned for exposure, said member being adapted to receive identification data upon its surface, and thereby to provide contrasting surface portions, permitting the identification-marking of said film.

2. A structure according to claim 1, but in which the said sheet-like member has holding end formations in the plane of the body thereof to engage the lateral turned edges of the film septum.

3. A structure according to claim 1, but in which the sheet-like member has an edge extending transversely of said film septum, and in which the said member has at each end two spaced extensions lying in the plane of the body of said member to engage and be held by the turned-over edges of the septum, said septum receiving under its turned-over upper edge the upper transversely extending edge of the sheet-like member.

4. A structure according to claim 1, but in which the said sheet-like member is provided at its opposite ends with locking formations engaging the said lateral turned-over edge portions of said film septum and thereby holding the front edge of the sheet-like member away from the face of the septum.

5. As a new article of manufacture and sale, a negative identifying device adapted for use with a standard or unmodified sensitized-surface holder for photographic purposes, said device comprising a flat, sheet-like member having a body and ends all lying in one plane, said member being adapted to be positioned in the said holder at an end where it will overlie an end portion only of the sensitized surface when the latter is positioned in the said holder, said sheet-like member being adapted to reecive identification data upon its surface, so as to provide contrasting surface portions, and thereby to effect the identification marking of the sensitized surface upon exposure thereof, said member being of approximately just sufficient length to extend across the sensitized-surface receiving portion of the holder to the lateral turned-over edges of the septum of the holder, its body being relatively very narrow in a direction transverse to the length of the said member so as to overlie the said positioned sensitized surface to a substantially minimum extent at points intermediate the lateral edges of said sensitized surface, the said sheet-like member having at its ends extensions in the plane of the body portion, adapted to be received at a face of a turned-over edge of the septum, and thereby to be held in place.

6. As a new article of manufacture and sale, a negative identifying device adapted for use with a standard or unmodified sensitized-surface holder for photographic purposes, said device comprising a flat, sheet-like member having a body and ends all lying in one plane, said member being adapted to be positioned in the said holder at an end where it will overlie an end portion only of the sensitized surface when the latter is positioned in the said holder, said sheet-like member being adapted to receive identification data upon its surface, so as to provide contrasting surface portions, and thereby to effect the identification marking of the sensitized surface upon exposure thereof, said member being of approximately just sufficient length to extend across the sensitized-surface receiving portion of the holder to the lateral turned-over edges of the septum of the holder, its body being relatively very narrow in a direction transverse to the length of said member so as to overlie the said positioned sensitized surface to a substantially minimum extent at points intermediate the lateral edges of said sensitized surface, the said sheet-like member having at each end two extensions in the plane of the body portion, one adapted to underlie the upper turned-over edge of the septum, and the other adapted to overlie a turned-over side edge of the septum.

7. As a new article of manufacture and sale, a negative-identifying device adapted for use with a standard or unmodified sensitized-surface holder for photographic purposes, said device comprising a flat, sheet-like member having a body and ends all lying in one plane, said member being adapted to be positioned in the said holder at an end where it will overlie an end portion only of the sensitized surface when the latter is positioned in the said holder, said sheet-like member being adapted to receive identification data upon its surface, so as to provide contrasting surface portions, and thereby to effect the identification marking of the sensitized surface upon exposure thereof, said member being of approximately just sufficient length to extend across the sensitized-surface receiving portion of the holder to the lateral turned-over edges of the septum of the holder, its body being relatively very narrow in a direction transverse to the length of said member so as to overlie the said positioned sensitized surface to a substantially minimum extent at points intermediate the lateral edges of said sensitized surface, the said sheet-like member having at each end two extensions in the plane of the body portion, each upper extension being tapered and adapted to extend under the upper turned-over edge of the septum adjacent the upper ends of the turned-over side edges of the septum, and each lower extension being adapted to overlie such turned-over side edge of the septum near the upper end of such turned-over side edge.

8. A structure according to claim 7, but wherein each upper end extension is tapered substantially to a point and the lower extension is parallel-sided.

9. As a new article of manufacture and sale, a negative-identifying device adapted for use with a standard or unmodified sensitized-surface holder for photographic purposes, said device comprising a flat, sheet-like member having a body and ends all lying in one plane, said member being positioned in the said holder at an end where it will overlie an end portion only of the sensitized surface when the latter is positioned in the said holder, said sheet-like member being adapted to receive identification data upon its surface, so as to provide contrasting surface portions, and thereby to effect the identification marking of the sensitized surface upon exposure thereof, said member being of approximately just sufficient length to extend across the sensitized-surface receiving portion of the holder to the lateral turned-over edges of the septum of the holder, its body being relatively very narrow in a direction transverse to the length of said member so as to overlie the said positioned sensitized surface to a substantially minimum extent at points intermediate the lateral edges of said sensitized surface, the said sheet-like member having at each end a tapered extension lying in the same plane as the remainder of the member and adapted to enter the turned-over upper end of the septum and below such tapered extension having another extension also lying in the plane of the remainder of said member and itself adapted to overlie the lateral turned-over edges of the septum, so as to be held in place.

10. A sensitized-surface holder for photographic purposes having a film septum or septums provided with an upper, transversely extending, forwardly bent-over edge and opposite forwardly bent-over side edges, all to receive the sensitized material, in combination with a negative-identifying device comprising a flat, sheet-like member having a body and ends all lying in one plane, said member being adapted to be positioned in the said holder at the upper end thereof to overlie the upper edge portion only of the said sensitized surface when the latter is positioned in said holder with its edges within said turned-over edges, the said sheet-like member being adapted to receive identification data on its surface so as to provide contrasting surface portions and thereby to effect the identification marking of the sensitized surface upon exposure thereof, said member being of approximately just sufficient length to extend across the sensitized-surface receiving portion of the holder to the said turned-over lateral edges of the septum of the holder, the body of said sheet-like member being relatively very narrow in a direction transverse to the length thereof, the said sheet-like member having at each end an extension in the plane of the body thereof and adapted to be received at a face of a turned-over edge of the septum, and thereby to be held in place.

11. A sensitized-surface holder for photographic purposes having a film septum or septums provided with an upper, transversely extending, forwardly bent-over edge and opposite forwardly bent-over side edges, all to receive the sensitized material, in combination with a negative-identifying device comprisng a flat, sheet-like member having a body and ends all lying in one plane, said member being adapted to be positioned in the said holder at the upper end thereof to overlie the upper edge portion only of the said sensitized surface when the latter is positioned in said holder with its edges within said turned-over edges, the said sheet-like member being adapted to receive identification data on its surface so as to provide contrasting surface portions and thereby to effect the identification marking of the sensitized surface upon exposure thereof, said member being of approximately just sufficient length to extend across the sensitized-surface receiving portion of the holder to the said turned-over lateral edges of the septum of the holder, the body of said sheet-like member being relatively very narrow in a direction transverse to the length thereof, the said sheet-like member having at each end two extensions in the plane of the body portion, one adapted to underlie the upper turned-over edge of the septum and the other adapted to overlie a turned-over side edge of the septum.

12. A sensitized-surface holder for photographic purposes having a film septum or septums provided with an upper, transversely extending, forwardly bent-over edge and opposite forwardly bent-over side edges, all to receive the sensitized material, in combination with a negative-identifying device comprising a flat, sheet-like member having a body and ends all lying in one plane, said member being adapted to be positioned in the said holder at the upper end thereof to overlie the upper edge portion only of the said sensitized surface when the latter is positioned in said holder with its edges within said turned-over edges, the said sheet-like member being adapted to receive identification data on its surface so as to provide contrasting surface portions and thereby to effect the identification marking of the sensitized surface upon exposure thereof, said member being of approximately just sufficient length to extend across the sensitized-surface receiving portion of the holder to the said turned-over lateral edges of the septum of the holder, the body of said sheet-like member being relatively very narrow in a direction transverse to the length thereof, the said sheet-like member having at each end two extensions in the plane of the body portion, each upper end extension being tapered and adapted to extend under the upper turned-over edge of the septum adjacent the upper end of the turned-over side edges of the septum, and each lower extension being adapted to overlie such turned-over side edge of the septum near the upper end of such turned over side edge.

13. A structure in accordance with claim 5 but wherein the said sheet-like member is formed wholly of transparent material.

14. A structure in accordance with claim 5 but wherein the said sheet-like member is formed wholly of metal with openings for the transmission of light to the sensitized surface to form identification marking thereon.

15. A structure in accordance with claim 5 but wherein the said sheet-like member is of metal and has one or more separate identification tabs of substantially transparent material attached thereto.

BYRON L. SMITH.